Sept. 14, 1965 J. B. McCARTHY CLIFTON 3,206,613

TRANSISTOR SWITCHING DEVICE UTILIZING TRANSIENT VOLTAGE REDUCTION MEANS

Original Filed Aug. 7, 1958 2 Sheets-Sheet 1

JAMES BERNARD McCARTHY CLIFTON INVENTOR.

BY Rudolph J. Zuick

ATTORNEY

JAMES BERNARD Mc CARTHY CLIFTON
INVENTOR.

BY Rudolph J. Juick
ATTORNEY

United States Patent Office 3,206,613

Patented Sept. 14, 1965

3,206,613

TRANSISTOR SWITCHING DEVICE UTILIZING TRANSIENT VOLTAGE REDUCTION MEANS

James Bernard McCarthy Clifton, Wanamassa, N.J., assignor to The Bendix Corporation, Eatontown, N.J., a corporation of Delaware Original application Aug. 7, 1958, Ser. No. 753,737, now Patent No. 3,125,726, dated Mar. 17, 1964. Divided and this application May 2, 1962, Ser. No. 191,963
5 Claims. (Cl. 307—88.5)

This invention relates to switching devices and more particularly to a transistor switching arrangement provided with means to prevent damage to the transistor due to excessive transient voltages arising during the switching period.

This application is a division of my co-pending United States application Serial No. 753,737, filed August 7, 1958, now Patent No. 3,125,726, and entitled "Apparatus for Converting D.-C. Power to A.-C. Power." Such prior-filed application discloses a power inverter which comprises an oscillator having a sine wave output together with circuit means, including a pulse width modulator and a limiter amplifier, for the production of symmetrical positive and negative pulses of the same repetition frequency as the oscillator. These pulses, which are closely controlled in width and which are separated by intervals (or dwell periods of substantially zero level) are applied to a power amplifier operating in a switching mode and from which the useful alternating current output is obtained. The present invention is directed to the power amplifier and associated circuit means to prevent damage to the amplifier elements by high transient voltages.

An object of this invention is the provision of an arrangement for reducing the transient voltages appearing across a switching device at the moment the switching device interrupts the flow of electrical current.

An object of this invention is the provision of an electronic switching device for periodically connecting a source of D.-C. potential to an output circuit and including an inductor-rectifier combination connected across the source of D.-C. potential thereby to reduce the transient voltage developed across the switching device at the moment of current interruption.

An object of this invention is the provision of an inverter circuit including transistor switching means periodically connecting a source of D.-C. potential to an output circuit, and an inductor having a pair of windings, one winding being connected in series circuit with the source of D.-C. potential and the other winding being connected across the source of D.-C. potential through a rectifier thereby to prevent transient voltages from appearing at the transistor switching means.

An object of this invention is the provision of an inductor for use in a switching circuit, which inductor has at least two parallel magnetic circuits each of which saturates at different values of inductor circuit.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

Figure 1:
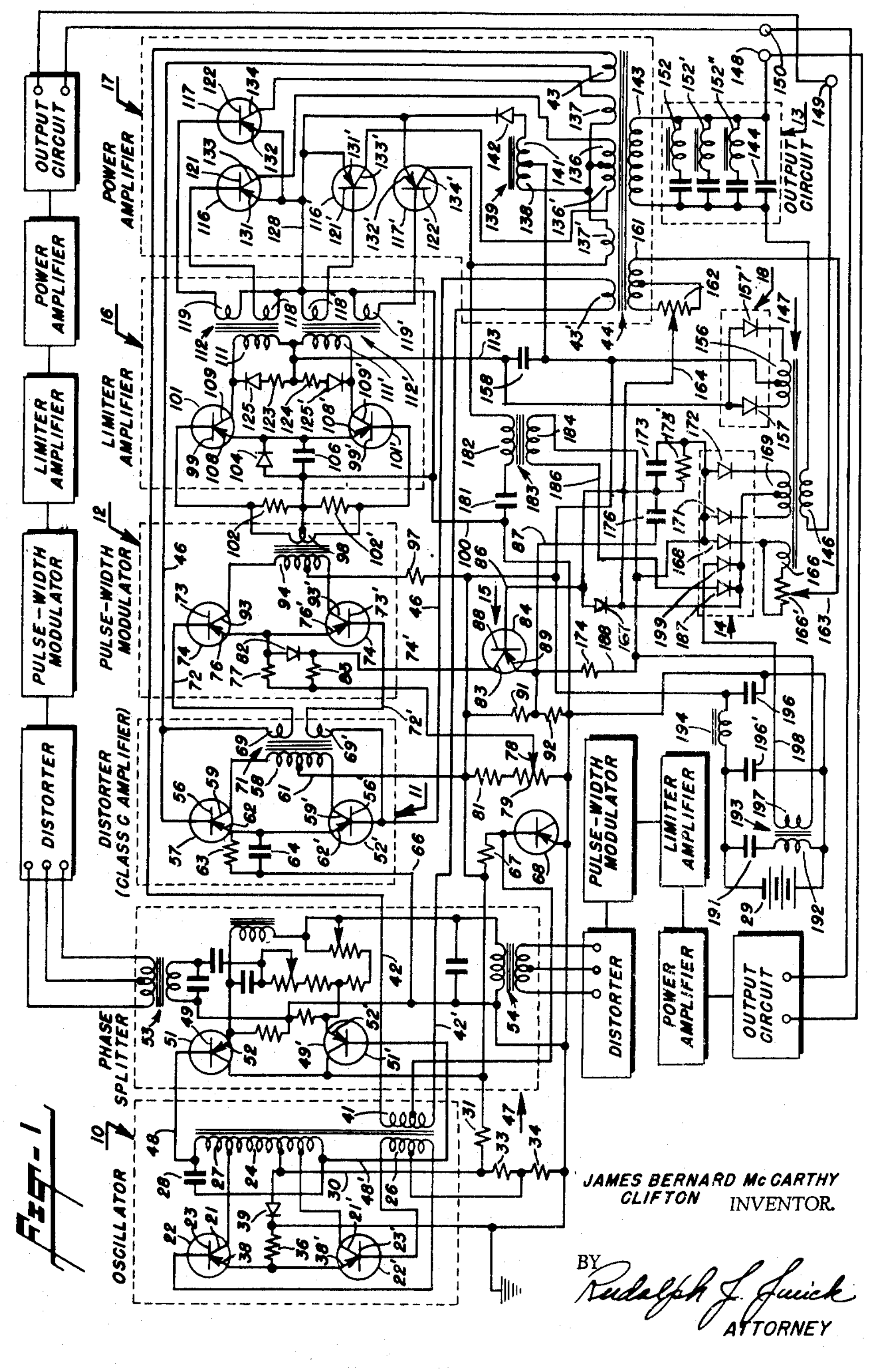
FIGURE 1 is a schematic circuit diagram showing the circuit of this invention incorporated in a power inverter.
Figure 2:
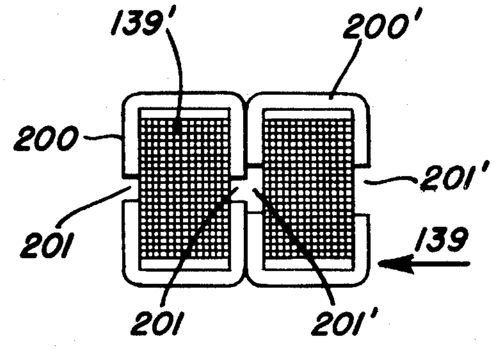
FIGURE 2 is a diagrammatic presentation of the novel inductor device.

It is here pointed out that FIGURE 1 of the drawings, to which reference now is made, is a schematic circuit diagram of a power inverter identified as FIGURE 2 in the parent application above referred to. The drawing shows a three phase inverter which comprises three single phase inverters operating at the same frequency but at a phase displacement of 120 degrees each from the other. Two phases of the apparatus are shown in block diagram form since they have identical counterparts in the one phase system which is shown in detail.

Briefly, the apparatus comprises an oscillator 10 providing a sine wave output of, say, 400 cycles per second. One output of the oscillator feeds a distorter 11, which distorter may be a class C amplifier. Another output from the oscillator is applied to a pulse width modulator 12, together with the output from the distorter. The modulator is operated in an over-biased class B mode by the application of a controlled backward bias on the transistors, the source of such backward bias including a signal from the output circuit 13 of the apparatus. The signal from the distorter adds to the sine wave signal of the oscillator to provide an input signal to the pulse width modulator which is of increased slope, or steepness, in the region of the positive and negative peaks thereof, as compared to sine wave input alone. The output from the pulse width modulator, therefore, comprises alternate positive and negative going pulses which are accurately and smoothly controlled in width by means of the D.-C. bias applied thereto from the inverter output circuit through the rectifier 14 and the D.-C. amplifier 15. Such controlled pulses are applied to a limiter amplifier 16, or multi-vibrator.

The output from the limiter amplifier 16 comprises separate positive and negative going pulses of approximately square wave form, each wave having a width equal to the width of the pulses applied to the input thereof from the pulse width modulator. Such square wave output pulses from the limiter amplifier drive a power amplifier 17, which is a push-pull arrangement operating in a switching mode. The output from the power amplifier is connected to the resonant output circuit 13.

As shown, the power amplifier 17 comprises two push-pull amplifier arrangements with the outputs thereof connected in parallel. Separate inputs to each of the power transistors 116 and 116' and 117 and 117' are obtained from the separate transformer secondary windings 118, 118', 119 and 119', respectively, of the transformers 112 and 112'. The individual transistor emitters 131, 131' and 132, 132' are connected together and to the common junction between the transformer secondary windings by the lead 128, which common junction is connected to ground through the wire 100. The use of the separate transformers 112 and 112' in the input circuit to the power amplifier 17 for individually driving the two halves of the push-pull amplifier arrangement, rather than a single transformer having a center-tapped winding, affords certain practical advantages. It will be understood that during the relaxation period corresponding to the off conditions of the transformers 112 and 112', a reverse voltage, decaying approximately exponentially, is available across the secondary windings of the individual transformers to provide a reverse bias for the power amplifier transistors to prevent runaway of the power amplifier. The duration and magnitude of the reverse bias may be controlled by the value of the resistances 123, 124 and the associated diodes 125, 126, shunted across the primary windings 111 and 111' of the transformers 112 and 12'.

The transistor collectors 133, 133' and 34, 134' connect to transformer primary windings 136, 136' and 137 and 137', respectively, of the power output transformer 44. The negative source of potential 29 is connected to the transistor collectors of the power amplifier through the respective primary windings of the transformer 44 and a primary winding 138 of an inductor 139. In accordance with my invention, the inductor 139 is provided with a secondary winding 141 connected in series with a rectifier 142, which series combination is connected across the negative source of potential 29. The direction of connection of the secondary winding 141 and the direction of forward current flow of the rectifier 142 is such that the energy stored in the winding 138 in series with the source of potential 29 at the instants the current through the power amplifier transistors is interrupted, is fed back to the power source 29.

The inductor, or swinging choke 139, in the circuit of the power amplifier 17, is provided with a novel core construction, which construction is seen in the sectional view of FIGURE 2. Referring, then, to FIGURE 2, the inductor 139 therein shown includes a winding, or windings, designated 139′ (which may comprise the windings designated 138 and 141, in FIGURE 2). The magnetic circuit comprises two cores 200 and 200′ of magnetic material, which are shown as being of a U or C shape. Each core is provided with a different length gap, the gap 201 in the core 200 being shown smaller than the gap 201′ in the core 200′. Hence, it will be understood that the one magnetic path which includes the relatively short gap, provides the inductor with a relatively high inductance with low values of D.-C. current through the winding 139′. Due to the relatively longer gap 201′, in the other core 200′, the inductance thereof remains relatively low with the low values of D.-C. current through the winding 139′. As the D.-C. current through the winding 139′ increases to a sufficiently high value, the first magnetic path, or core, 200 saturates, or approaches saturation such that the inductance decreases. With suitable gapping, however, the second core 200′ produces the desired inductance at the higher values of D.-C. current through the inductor winding. If desired, other magnetic circuits linking the winding 139′ may be included having gap lengths between those in the cores 200 and 200′ to determine the inductance between the inductance at the lowest and highest D.-C. currents, within the requirements of the system. It will be apparent to those skilled in this art, that cores of other design and shape may be utilized in the inductor. The essential feature of my novel core construction comprises the provision of parallel magnetic paths, which contribute different inductances at different values of current through the inductor windings, or winding.

Obviously, any desired number of windings may be included in the inductor construction shown in FIGURE 2. For minimum leakage inductance, the inductor 139 preferably is wound quadrifilar, with the section 138 (see FIGURE 1) consisting of two such wires in parallel and the winding 141 consisting of two such wires in series.

It will be understood that the power amplifier transistors which operate in a switching mode, function as synchronous "switches" in the conversion of D.-C. power from the supply source 29 to A.-C. power at the output transformer 44. Any switch, and particularly the transistor switching arrangement of the power amplifier, is limited with respect to the amount of current which can be passed therethrough. Since a substantially sinusoidal waveform is desired at the output of the transformer 44, it will be apparent that a generally sinusoidal primary E.M.F. is required at the primary windings 136, 136′ thereof. The potential of the D.-C. supply 29 is substantially constant whereby the actual current flows through the current limiting transistors 116, 116′, and 117, 117′, would vary from moment to moment as the sinusoidal voltage at the primary windings 136, 136′ changed relative to the D.-C. supply potential applied alternately to the two halves of said primary. In order effectively to utilize any current-limited switching device, it is common practice to include an inductor in series with the switching device, or in series with the supply potential. Such series inductor corresponds to the inductor winding 138 of the inductor 139. The series inductor stores the magnetic energy represented by the difference in the voltage between the rectangular waveform which would be represented at the transformer primary winding by the D.-C. source of supply in the absence of such inductor and the substantially sinusoidal waveform represented at the primary winding due to the sine wave output voltage at the transformer secondary winding. Such series inductance arrangement, however, is suitable only when the transition time of the switching arrangement is negligible compared to a period of alteration. Under these conditions, the current drawn by the transistors is only slightly pulsating. When the switching time is more than negligible and becomes a noticeable portion of the period of a cycle of operation, high voltage transients may develop across the series inductor winding 138 at the moments when the current flowing in the winding is suddenly interrupted by the switching transistors. This high transient voltage is fed through the transformer primary windings 136, 136′ to the switch transistors. The transistors must, therefore, break the current which has been flowing immediately prior to the breaking instant and at the high transient voltage, which voltage may be much greater than the normal voltage appearing at the one set of switching transistors at times when the other set of switching transistors is conducting.

In order to reduce the transient voltage produced across the series inductor winding 138, under the above conditions, there is included the secondary winding 141 on the inductor, which winding is connected in series with the rectifier 142 across the D.-C. supply source 29. The direction and connection of the secondary winding and the direction of current flow through the rectifier are such that the energy stored in the inductor at the moment of current interruption is fed back to the supply source 29. The ratio of the turns of the primary winding 138 to the secondary winding 141 is such that the transient voltage developed across the switching transistors in the power amplifier, at the moment of current interruption, is reduced to a safe value. A turns ratio of 1 to 2 has been found to be satisfactory.

It will be noted that the feedback arrangement which includes the inductor 139 and the rectifier 142 is not limited for use in power amplifiers utilizing transistors operating in a switching mode. The arrangement may be used with other switching devices such as semi-conductors, mechanical switches, vacuum tubes, gas-filled rectifiers with control grids, and the like.

Figure 3:
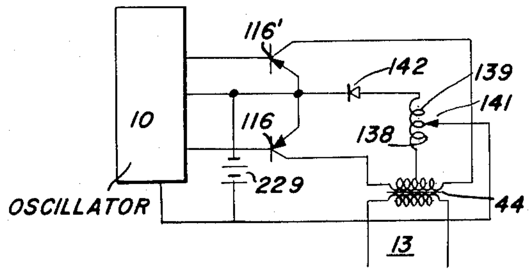
FIGURE 3 is a simplified schematic circuit diagram illustrating the invention.

FIGURE 3 is a simplified circuit of the invention as described in detail in FIGURE 1. The same reference numerals have been assigned to like elements in the two figures. A detailed description of the circuit of FIGURE 3 has been omitted as it is believed to be self-explanatory in view of the detailed description of FIGURE 1.

Having now described my invention, what I desire to protect by Letters Patent is set forth in the following claims.

I claim:

1. An inverter circuit comprising, a source of D.-C. potential, an output transformer having a primary winding, a switch periodically connecting the source of D.-C. potential to the said primary winding, an inductor having a first and a second winding, the said first winding being connected in series circuit with the source of D.-C. potential and said primary winding, a rectifier connected in series circuit with the second inductor winding, means connecting the series connected second inductor winding and rectifier across the source of D.-C. supply potential through said switch.

2. The invention as recited in claim 1 wherein the two inductor windings are carried by a pair of magnetic cores each of which saturates at different magnitudes of current flowing through the windings.

3. The invention as recited in claim 1 wherein the switch comprises a transistor operating in the switching mode.

4. An inverter circuit comprising a source of D.-C. potential, a transformer having a center-tapped primary winding, a synchronous switch alternately connecting the said source of D.-C. potential to the primary transformer winding in opposite directions, an inductor having a first and a second winding, means connecting the said first inductor winding between one side of said source of D.-C. potential and to the center tap of said primary winding, a rectifier connected in series circuit with the second inductor winding, and means connecting the series connected second inductor winding and rectifier across the source of D.-C. potential, the direction of current flow through the rectifier being such that the energy stored in the inductor windings is fed back to the source of D.-C. potential upon opening of the switch.

5. The invention as recited in claim 1 wherein the said first inductor winding has a turns ratio of 1 to 2 to said second inductor winding.

References Cited by the Examiner

UNITED STATES PATENTS

| | | | |
|---|---|---|---|
| 2,920,260 | 1/60 | Goffstein | 321—49 X |
| 3,014,172 | 12/61 | Brunson | 321—44 X |
| 3,061,769 | 10/62 | Smyth | 307—88 X |

JOHN W. HUCKERT, *Primary Examiner.*

ARTHUR GAUSS, *Examiner.*